US007889235B2

(12) United States Patent
Urisu

(10) Patent No.: US 7,889,235 B2
(45) Date of Patent: Feb. 15, 2011

(54) LIQUID CRYSTAL TELEVISION ADJUSTMENT SYSTEM, LIQUID CRYSTAL DISPLAY UNIT ADJUSTMENT SYSTEM, AND LIQUID CRYSTAL DISPLAY UNIT

(75) Inventor: Takayoshi Urisu, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 1121 days.

(21) Appl. No.: 11/603,363

(22) Filed: Nov. 21, 2006

(65) Prior Publication Data

US 2007/0115232 A1 May 24, 2007

(30) Foreign Application Priority Data

Nov. 24, 2005 (JP) ............................ 2005-339529

(51) Int. Cl.

| | |
|---|---|
| ***H04N 17/00*** | (2006.01) |
| ***H04N 17/02*** | (2006.01) |
| ***H04N 5/57*** | (2006.01) |
| ***H04N 5/58*** | (2006.01) |
| ***H04N 5/21*** | (2006.01) |
| ***H04N 9/68*** | (2006.01) |
| ***H04N 9/73*** | (2006.01) |
| ***H04N 9/30*** | (2006.01) |
| ***G09G 3/36*** | (2006.01) |

(52) U.S. Cl. ....................... 348/191; 348/189; 348/603; 348/631; 348/645; 348/655; 348/687; 348/791; 345/88

(58) Field of Classification Search ................. 348/180, 348/189, 191, 603, 631, 645, 655, 687, 790–791; 345/88

See application file for complete search history.

(56) References Cited

U.S. PATENT DOCUMENTS 6,611,249 B1 * 8/2003 Evanicky et al. ............ 345/102
6,704,008 B2 * 3/2004 Naito et al. ................. 345/207
6,727,489 B2 * 4/2004 Yano .......................... 250/221
6,862,029 B1 * 3/2005 D'Souza et al. ............. 345/690
7,050,121 B2 * 5/2006 Kim ........................... 348/744

(Continued)

FOREIGN PATENT DOCUMENTS

JP 08-317417 11/1996
JP 11-305734 11/1999
JP 2001-238227 8/2001

*Primary Examiner*—Brian Yenke
(74) *Attorney, Agent, or Firm*—Yokoi & Co., U.S.A., Inc.; Toshiyuki Yokoi

(57) ABSTRACT

A PC 40 outputs a picture signal for a white color to a TV 100, and generates chromaticity information by measuring luminance values of respective RGB color components from a picture displayed on the TV 100, thereby determining whether the chromaticity information undergoes a change by varying an output of any of the RGB color components by a predetermined amount. Subsequently, when the chromaticity information has not undergone a change, the contrast of the TV 100 is lowered by a predetermined amount, and re-acquisition re-determination of chromaticity information is executed. On the other hand, when the chromaticity information has undergone a change, determination is made on whether the chromaticity information substantially matches chromaticity information representing white, and in the affirmative case, a white balance adjustment value is stored in an EEPROM 112 while in the negative case, the re-acquisition/re-determination of chromaticity information is repeated.

7 Claims, 7 Drawing Sheets

U.S. PATENT DOCUMENTS

| | | | | |
|---|---|---|---|---|
| 7,542,055 | B2 * | 6/2009 | Matsuda et al. | 345/690 |
| 7,548,279 | B2 * | 6/2009 | Miyazawa et al. | 348/656 |
| 7,567,301 | B2 * | 7/2009 | Higashi | 348/671 |
| 7,777,756 | B2 * | 8/2010 | Kwak et al. | 345/589 |
| 2003/0117414 | A1 * | 6/2003 | Sasaki | 345/589 |
| 2005/0103976 | A1 * | 5/2005 | Ioka et al. | 250/208.1 |

* cited by examiner

LIQUID CRYSTAL TELEVISION ADJUSTMENT SYSTEM, LIQUID CRYSTAL DISPLAY UNIT ADJUSTMENT SYSTEM, AND LIQUID CRYSTAL DISPLAY UNIT

CROSS-REFERENCES TO RELATED APPLICATIONS

The present application is related to the Japanese Patent Application No. 2005-339529, filed on Nov. 24, 2005, the entire disclosure of which is expressly incorporated by reference herein.

BACKGROUND OF THE INVENTION (1) Field of the Invention

The invention relates to a liquid crystal television adjustment system, a liquid crystal display unit adjustment system, and a liquid crystal display unit, capable of implementing white balance adjustment.

(2) Description of the Related Art

For color reproduction in a display unit, it is necessary to cause a color signal of a picture signal to sufficiently correspond to a color to be displayed in the display unit. In particular, it is a white color, as an achromatic color, that is indispensable for color display, and it should never happen that a change occurs to the chromaticity point of the white color due to a change in gradation of the achromatic color. In this connection, since an input-to-luminance characteristic is relatively well aligned among R, G, B in a cathode-ray tube display unit, it is possible to reproduce a white color constant in chromaticity against identical R, G, B input levels by aligning respective cut-off points for R, G, B in a cathode-ray tube with a black level of the picture signal, and by fixing an amplitude ratio among R, G, B on the basis of an amp gain.

However, with a liquid crystal display unit, the input-luminance characteristic thereof differs from that of the cathode-ray tube display unit, and further, an amplitude ratio among R, G, B is not constant, so that chromaticity of the white color undergoes a change according to a change in a gradation level of the achromatic color, thereby causing a problem in that accurate color reproduction cannot be implemented.

In JP No. 2001-238227-A, there has been disclosed a liquid crystal display unit capable of adjusting white balance with the use of a look-up table prepared beforehand so as to be able to obtain white balance, including a V-T characteristic of a liquid crystal panel.

In JP No. 1999-317417-A/, there has been disclosed a white balance circuit comprising a feedback circuit capable of adjusting a gain control signal level if an output level of a picture signal exceeds a reference voltage.

In JP No. 2002-305734-A/, there has been disclosed a liquid crystal display unit wherein an average picture level (ALP) is detected from RGB signals by an average picture level (ALP) detection circuit, and a black level is lowered by deceasing a gain with chromaticity of a white color being kept constant when the ALP is high while lowering of the black level is checked by increasing the gain regardless of an RGB ratio when the ALP is low.

With a conventional display unit of a type that does not employ natural light, such as that of a liquid crystal television, as respective outputs of RGB colors are increased, color saturation is reached at a point in time when an open-area ratio of each of liquid crystal cells for the respective colors is turned to a 100%, so that it has been impossible to implement adjustment itself even if the outputs are further increased. In addition, having taken into consideration chromaticity variation in a backlight lamp, variation in open-area ratio among liquid crystal cells, and so forth, there has been the need for making adjustment of the white balance on the extremely inner side of a dynamic range. More specifically, in the case of adjusting the white balance by use of the two-point tracking method, it has been necessary to secure an adjustment margin for open-area ratios of the respective liquid crystal cells (higher luminance side: 70 to 100%, lower luminance side: 40 to 0%) such as the open-area ratios of the respective liquid crystal cells starting the adjustment of the white balance on the higher luminance side, set to 70%, and the open-area ratios of the respective liquid crystal cells starting the adjustment of the white balance on the lower luminance side, set to 40%, so that it has been impossible to achieve precision in adjusting the white balance.

BRIEF SUMMARY OF THE INVENTION

The invention discloses a liquid crystal television adjustment system, a liquid crystal display unit adjustment system, and a liquid crystal display unit, wherein white balance adjustment can be implemented by using a dynamic range to the full, and accuracy in the white balance adjustment is enhanced.

One aspect of the present invention provides a liquid crystal television adjustment system comprising: a liquid crystal television including a tuner for receiving an analog television signal according to a predetermined broadcasting system from an antenna, thereby generating an intermediate frequency signal before outputting the same, a nonvolatile semiconductor memory capable of rewriting information, a scaler IC for executing analog-to-digital conversion of an analog picture signal as inputted, and generating RGB picture signals to thereby execute white balance adjustment for respective RGB color components of the RGB picture signals by referring to a white balance adjustment value stored in the nonvolatile semiconductor memory, before outputting a picture with white balance adjusted, a liquid crystal module for displaying a picture on a predetermined screen on the basis of the RGB picture signals as inputted, and a microcomputer for controlling the tuner, nonvolatile semiconductor memory, scaler IC, and liquid crystal module; and a computer having a color analyzer capable of picking up an image of a screen of the liquid crystal television, and outputting information corresponding to luminance of a picture as picked up, causing a test pattern in white to be displayed on the screen of the liquid crystal television, causing the color analyzer to pick up an image of the test pattern displayed on the screen, and acquiring the information corresponding to the luminance of the picture as picked up, thereby setting an adjustment value for adjusting white balance according to the information acquired into the liquid crystal television, wherein the microcomputer sets a white balance adjustment value by setting an output ratio among the respective RGB color components of the RGB picture signals, and causes contrast to be lowered by a predetermined amount by control of the computer to thereby cause the adjustment value set by the computer to be stored in the nonvolatile semiconductor memory, and the computer outputs a picture signal for a white color that is a reference signal to the liquid crystal television, causing the color analyzer to pick up the image of the picture displayed on the screen of the liquid crystal television on the basis of the picture signal outputted, acquires information expressing luminance values of the respective RGB colors of the picture as picked up to thereby generate information expressing chromaticity, determines whether or not the information expressing the chromaticity undergoes a change by increasing outputs of the respective RGB colors of the picture displayed on the screen by a predetermined amount at high luminance while determining whether or not the information expressing the chromaticity undergoes a change by decreasing the outputs of the respective RGB colors of the picture displayed on the screen by a predetermined amount at low luminance, lowers the contrast in the screen by a predetermined amount by controlling the liquid crystal television when it is determined that the information expressing the chromaticity has not changed, and sets the adjustment value into the liquid crystal television when the information expressing the chromaticity substantially matches information expressing chromaticity of a white color.

Another aspect of the invention provides a liquid crystal display unit adjustment system comprising a liquid crystal display unit for generating picture data expressed in terms of first to third color components, and expressed in terms of digital gradation value for each of a multitude of pixels making up a screen on the basis of a picture signal inputted while storing an adjustment value for adjusting white balance of the picture data in a nonvolatile semiconductor memory, and executing white balance adjustment of the picture data by referring to the adjustment value before displaying a picture on a predetermined screen, and an adjustment unit for setting the adjustment value for adjusting the white balance into the liquid crystal display unit, wherein the liquid crystal display unit includes an adjustment value setting unit for setting the adjustment value for adjusting white balance by setting an output ratio among the first to third color components of the picture data, a contrast adjustment unit for causing contrast to be lowered by a predetermined amount by controlling the adjustment unit, and an adjustment value storing unit for causing the adjustment value as set by the adjustment unit to be stored in the semiconductor memory, and the adjustment unit comprises a white picture signal outputting unit for outputting a picture signal for a white color to the liquid crystal display unit, a chromaticity information acquiring unit for measuring the respective luminance values of the first to third color components from the picture displayed on the screen of the liquid crystal display unit on the basis of the picture signal as outputted, thereby generating the chromaticity information, a chromaticity saturation determination unit for altering the respective outputs of the first to third color components of the picture displayed on the screen by a predetermined amount, thereby determining whether or not the chromaticity information undergoes a change, a contrast adjustment directing unit for lowering the contrast on the screen by the predetermined amount by controlling the liquid crystal display unit when the chromaticity saturation determination unit determines that the chromaticity information has not undergone a change, a chromaticity determination unit for determining whether or not the chromaticity information substantially matches chromaticity information on a white color when the chromaticity saturation determination unit determines that the chromaticity information has changed, and an adjustment value setting unit for setting a predetermined adjustment value into the liquid crystal display unit.

More specifically, after the adjustment value setting unit sets the adjustment value for adjusting the white balance by setting the output ratio among the first to third color components of the picture data, the white picture signal outputting unit outputs the picture signal for the white color to the liquid crystal display unit, and the chromaticity information acquiring unit measures the respective luminance values of the first to third color components from the picture displayed on the screen of the liquid crystal display unit on the basis of the picture signal as outputted, thereby generating the chromaticity information, whereupon the chromaticity saturation determination unit alters the respective outputs of the first to third color components of the picture displayed on the screen by the predetermined amount, thereby determining whether or not the chromaticity information undergoes the change. Then, the contrast adjustment directing unit lowers the contrast on the screen by the predetermined amount by controlling the liquid crystal display unit when the chromaticity saturation determination unit determines that the chromaticity information has not undergone the change, and the contrast adjustment unit causes the contrast to be lowered by the predetermined amount by controlling the adjustment unit, thereby causing the chromaticity information acquiring unit to re-acquire the chromaticity information. Further, the chromaticity determination unit determines whether or not the chromaticity information substantially matches the chromaticity information on the white color when the chromaticity saturation determination unit determines that the chromaticity information has changed, and in the affirmative case, the chromaticity determination unit causes the adjustment value setting unit to set a predetermined adjustment value into the liquid crystal display unit, and the adjustment value storing unit causes the adjustment value as set by the adjustment unit to be stored in the semiconductor memory. On the other hand, in the negative case, the chromaticity information acquiring unit is caused to re-acquire the chromaticity information.

With the present invention having the above-described configuration, white balance adjustment as intended can be effected on a high luminance side above the adjustment value as well as a low luminance side below the adjustment value, so that a white color in chromaticity close to a design value can be implemented. Further, as variation by the product can be offset, high quality products can be provided. Furthermore, in the case where a design value varies according to a product destination, it has been a practice to decide a method for the adjustment on a case-by-case basis, however, with the present invention, white balance adjustment can be effected in the same way in the same environment, and production is possible in a unified environment. Furthermore, the adjustment using the dynamic range to the full can be implemented regardless of the variation by the product.

An optional aspect of the present invention provides a liquid crystal display unit adjustment system, wherein in the case of adjusting the white balance at a point on a high luminance side, the chromaticity saturation determination unit determines whether or not the chromaticity information undergoes a change by increasing an output of any of the first to third color components by a predetermined amount.

Another optional aspect of present invention provides a liquid crystal display unit adjustment system, wherein in the case of adjusting the white balance at a point on a low luminance side, the chromaticity saturation determination unit determines whether or not the chromaticity information undergoes a change by decreasing an output of any of the first to third color components by a predetermined amount.

Another optional aspect of the present invention provides a liquid crystal display unit adjustment system, wherein the liquid crystal display unit comprises a tuner for receiving television signals at desired frequencies via an antenna, and selecting only a required signal out of the television signals received before outputting an analog picture signal, a nonvolatile semiconductor memory capable of rewriting information, a scaler IC for executing analog-to-digital conversion of the analog picture signal as inputted, and generating RGB picture signals expressed in respective RGB color components to thereby execute white balance adjustment for the respective RGB color components of the RGB picture signals by referring to white balance adjustment values stored in the nonvolatile semiconductor memory, before outputting a picture with white balance adjusted, a liquid crystal module for displaying a picture on a predetermined screen on the basis of the RGB picture signals as inputted, and a microcomputer for controlling the tuner, nonvolatile semiconductor memory, scaler IC, and liquid crystal module.

Another aspect of the invention provides a liquid crystal display unit for generating picture data expressed in terms of first to third color components, and expressed in terms of digital gradation value for each of a multitude of pixels making up a screen on the basis of a picture signal inputted while storing an adjustment value for adjusting white balance of the picture data in a nonvolatile semiconductor memory, and executing white balance adjustment of the picture data by referring to the adjustment value before displaying a picture on a predetermined screen, said liquid crystal display unit comprising an adjustment value setting unit for setting the adjustment value for adjusting white balance by setting a output ratio among the first to third color components of the picture signal inputted, a white picture signal outputting unit for outputting a picture signal for a white color to the screen, a chromaticity information acquiring unit for measuring respective luminance values of the first to third color components of the picture displayed on the screen of the liquid crystal display unit on the basis of the picture signal as outputted, thereby acquiring chromaticity information, a chromaticity saturation determination unit for altering respective outputs of the first to third color components of the picture displayed on the screen by a predetermined amount, thereby determining whether or not the chromaticity information undergoes a change, a contrast adjustment directing unit for lowering the contrast on the screen by a predetermined amount by controlling the liquid crystal display unit when the chromaticity saturation determination unit determines that the chromaticity information has not undergone a change, a chromaticity determination unit for determining whether or not the chromaticity information substantially matches chromaticity information on the white color when the chromaticity saturation determination unit determines that the chromaticity information has changed, and an adjustment value storing unit for storing the adjustment value in the nonvolatile semiconductor memory.

More specifically, the adjustment value setting unit sets the adjustment value for adjusting white balance by setting the output ratio among the first to third color components of the picture signal inputted, the white picture signal outputting unit outputs the picture signal for the white color to the screen, the chromaticity information acquiring unit measures the respective luminance values of the first to third color components of the picture displayed on the screen of the liquid crystal display unit on the basis of the picture signal as outputted, thereby acquiring the chromaticity information, the chromaticity saturation determination unit alters the respective outputs of the first to third color components of the picture displayed on the screen by the predetermined amount, thereby determining whether or not the chromaticity information undergoes the change. Then, the contrast adjustment directing unit lowers the contrast on the screen by the predetermined amount by controlling the adjustment unit when the chromaticity saturation determination unit determines that the chromaticity information has not undergone the change, thereby causing the chromaticity information acquiring unit to re-acquire chromaticity information. Further, the chromaticity determination unit determines whether or not the chromaticity information substantially matches the chromaticity information on the white color when the chromaticity saturation determination unit determines that the chromaticity information has changed, and in the affirmative case, the chromaticity determination unit causes the adjustment value storing unit to store the adjustment value in the semiconductor memory. On the other hand, in the negative case, the chromaticity information acquiring unit is caused to re-acquire chromaticity information.

As described in the foregoing, with the present invention, it is possible to achieve white balance adjustment on the high luminance side above the adjustment value as well as the low luminance side below the adjustment value, so that a white color in chromaticity close to the design value can be implemented. Further, as variation by the product can be offset, high quality products can be provided. Furthermore, in the case where a design value varies according to a product destination, it has been a practice to decide a method for the adjustment on a case-by-case basis, however, with the present invention, the white balance adjustment can be effected in the same way in the same environment, and production is possible in a unified environment. Furthermore, the adjustment using the dynamic range to the full can be implemented regardless of the variation by the product.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character (s) present corresponding parts throughout.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Embodiments of the invention are described hereinafter in the following order.

Figure 1:
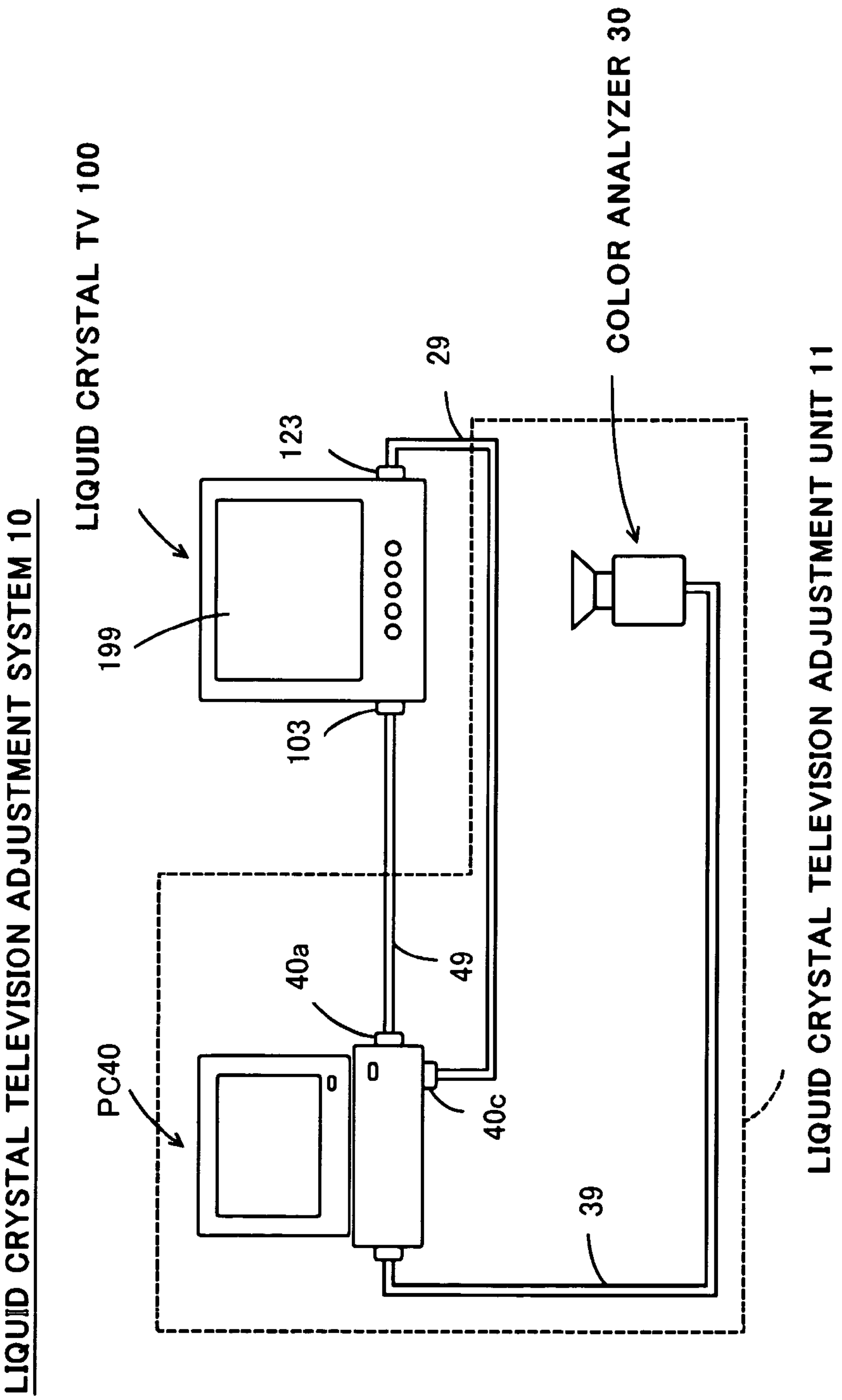
FIG. 1 is an exemplary illustration of a system block diagram broadly showing the configuration of a liquid crystal television adjustment system.
Figure 3:
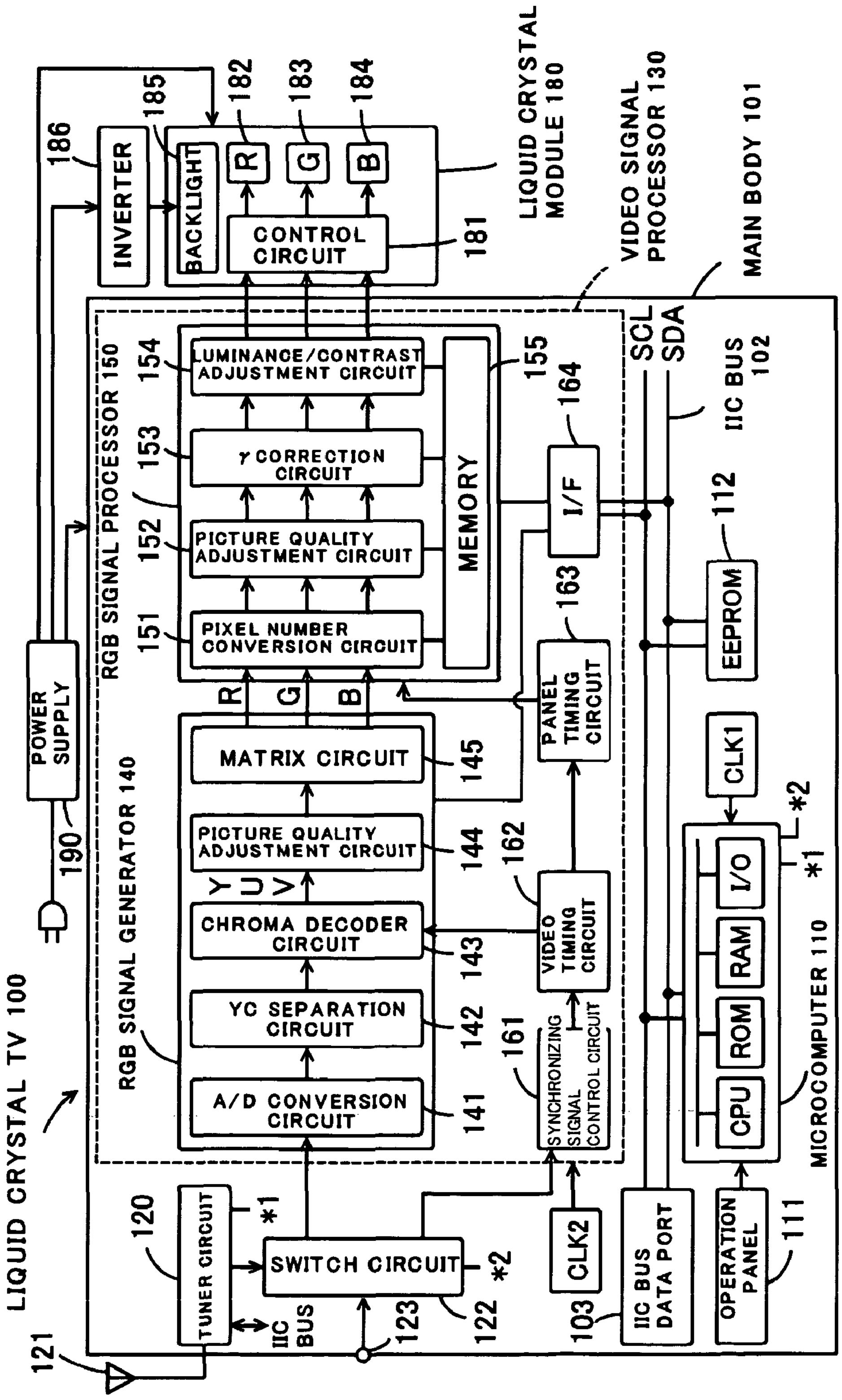
FIG. 3 is an exemplary illustration of a block diagram showing the configuration of a liquid crystal television.

(1) Configuration of a television adjustment system (2) A method for adjusting white balance (3) Configuration of a computer for adjustment (4) Description on a process for white balance adjustment, and a method for adjusting a liquid crystal television (5) Conclusion (1) Configuration of a Television Adjustment System FIG. 1 is a system block diagram broadly showing the configuration of a liquid crystal television adjustment system 10 according to one embodiment of the invention by way of example, and FIG. 3 is a block diagram showing the configuration of a liquid crystal television (TV) 100.

A liquid crystal television adjustment unit 11 according to the invention comprises a color analyzer 30, and a personal computer (PC) 40 that is a computer for use in adjustment. The liquid crystal television adjustment system 10 comprises the liquid crystal television adjustment unit 11, and the TV 100. The TV 100 as the target for adjustment is connected to the PC 40 via a predetermined signal cable 29, and is also connected to the PC 40 via another predetermined signal cable 49.

Figure 2:
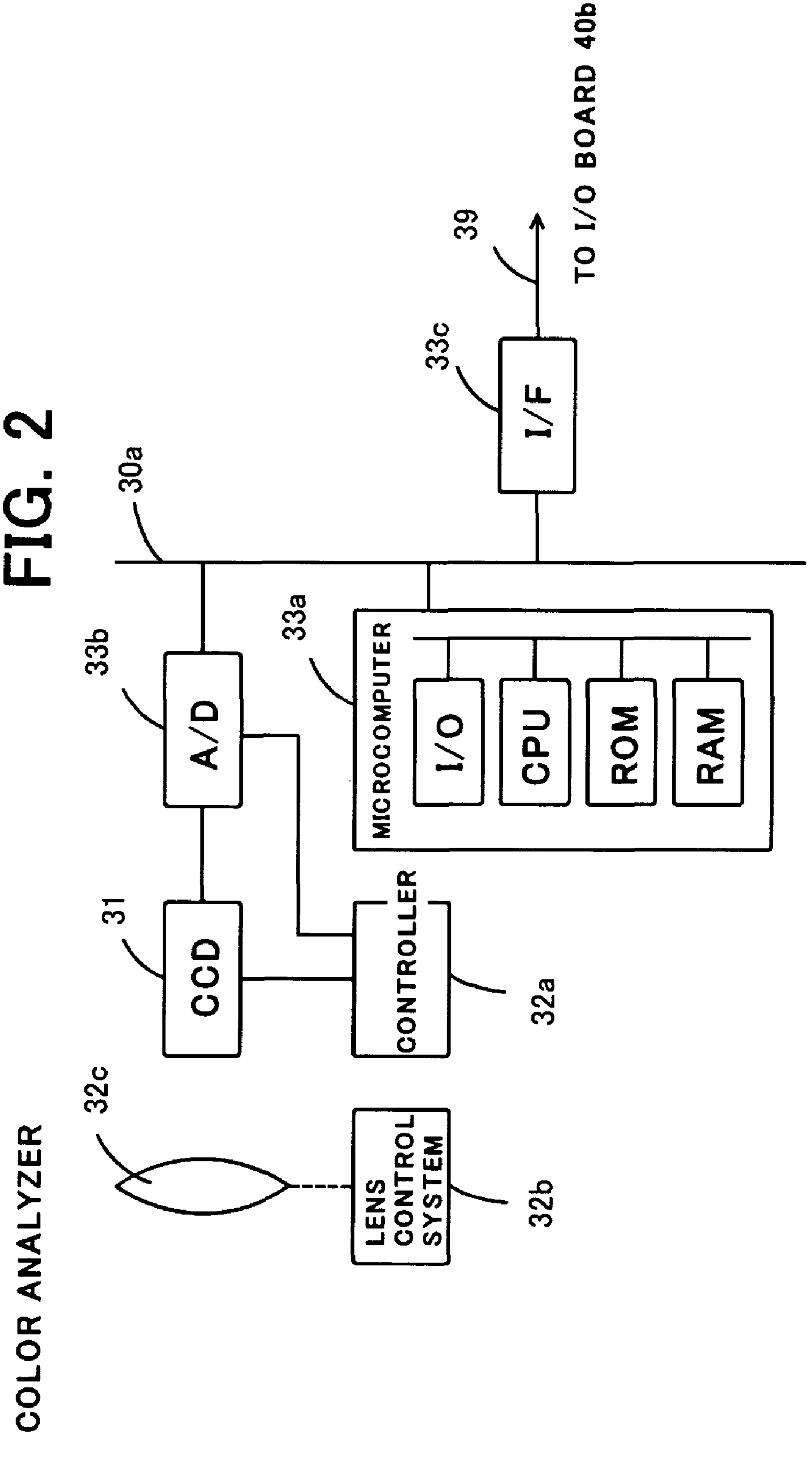
FIG. 2 is an exemplary illustration of a block diagram showing the configuration of a color analyzer.

FIG. 2 is a block diagram showing the configuration of the color analyzer 30. The color analyzer 30 comprises a CCD image pickup device 31, a controller 32*a* connected to the CCD image pickup device 31, a lens control system 32*b*, and so forth, serving as an optical system. Further, connected to a system bus 30*a* are a microcomputer 33*a* serving as a control system, comprising a CPU, ROM, RAM, I/O ports, and so forth, connected to an internal bus, an analog/digital converter (A/D converter) 33*b* connected to the controller 32*a* as well as the CCD image pickup device 31, an interface (I/F) 33*c* with a predetermined signal cable 39 connected thereto, and so forth. The controller 32*a* is connected to the I/O port of the microcomputer 33*a*, and the microcomputer 33*a* is capable of reading digital luminance values (measured values) from the A/D converter 33*b* via the system bus 30*a* while controlling the operation of controller 32*a* to thereby output the digital luminance values to outside from the I/F 33*c*. The PC 40 is connected to the I/F 33*c* via the cable 39.

With the configuration described as above, upon input of a signal from the PC 40, expressing an image pickup directive, the color analyzer 30 having the CCD image pickup device picks up an image of a display screen 199 of the TV 100, the CCD image pickup device 31 detects a voltage corresponding to luminance for every CCD cell, and the A/D converter 33*b* converts the voltage into a digital voltage value (256 gradations from 0 to 255) corresponding to the voltage as detected, thereby detecting the digital voltage value after conversion as a luminance value. Further, as the gradation value outputted from the PC 40 to the TV 100 via the I/F 33*c*, and the cable 39 is acquired, a correlation between the luminance value, and the gradation value outputted from the PC 40 to the TV 100 is found. Then, data showing the correlation between the luminance value, and the gradation value outputted from the PC 40 to the TV 100 is outputted to the PC 40 via the I/F 33*c*, and the cable 39.

FIG. 3 is the block diagram showing the configuration of the liquid crystal television (TV) 100. The TV 100 comprises a power supply 190, a main body 101, an inverter 186, a liquid crystal module (liquid crystal display unit) 180, and so forth. The power supply 190 supplies a DC voltage at a predetermined voltage level to the main body 101, the inverter 186, and the liquid crystal module (liquid crystal display unit) 180. The inverter 186 receives the DC voltage from the power supply 190, and generates a high voltage to be supplied to a backlight 185 of the liquid crystal module 180.

The main body 101 comprises an IIC bus 102, an IIC bus data port 103, a microcomputer 110, an operation panel 111, an EEPROM 112, a tuner circuit 120, a switch circuit 122, a composite picture input terminal 123, a video signal processor 130, oscillation circuits CLK 1, CLK 2, and so forth, as shown in FIG. 3. The IIC bus data port 103, the microcomputer 110, the EEPROM 112, the tuner circuit 120 centering around the well known tuner IC connected to an antenna 121, an I/F 164 of the video signal processor 130, and so forth are connected to the IIC bus 102 made up of a clock line SCL, and a data line SDA. Those circuits are mutually connected to each other via the IIC bus 102, transmitting and receiving serial data. The tuner circuit 120 is made up so as to be operated under control on the basis of a signal delivered via a different signal line from the microcomputer 110 directly connected thereto through the intermediary of the different signal line. The EEPROM 112 is equivalent to a nonvolatile semiconductor memory capable of rewriting information.

The video signal processor 130 that is activated upon input of a clock signal from the oscillation circuit CLK 2 has a principal part made up of ICs, comprising an RGB signal generator 140, an RGB signal processor 150, a synchronizing signal control circuit 161, a video timing circuit 162, a panel timing circuit 163, the I/F 164, and so forth. Further, the RGB signal generator 140 comprises an A/D conversion circuit 141, a YC separation circuit 142, a chroma decoder circuit 143, a picture quality adjustment circuit 144, a matrix circuit 145, and so forth while the RGB signal processor 150 comprises a pixel number conversion circuit 151, a picture quality adjustment circuit 152, a γ correction circuit 153, a luminance/contrast adjustment circuit 154, a memory 155, and so forth.

The oscillation circuit CLK 1, the operation panel 111, and a photo detector (not shown) for remote-control signals are directly connected to the microcomputer 110, and the microcomputer 110 is capable of receiving data corresponding to an operational input to the operation panel 111, and so forth, from the operation panel 111, and so forth. Further, the microcomputer 110 comprises a CPU, ROM, RAM, and a plurality of I/O ports, connected to an internal bus, a timer circuit (not shown), and so forth, and the CPU controls the TV in whole according to a program for controlling internal circuits, written to the ROM, and the EEPROM 112, respectively, thereby enabling the TV to exhibit the function thereof.

The EEPROM 112 stores information corresponding to adjustment values for respective colors of RGB, to be referred to in adjusting white balance upon display on the liquid crystal module 180. The information may be information expressing any of the adjustment values for the respective colors of RGB, adjustment values of IQ signals of a chromaticity signal, and a mixing ratio among the respective colors of RGB. The EEPROM 112 constitutes the nonvolatile semiconductor memory capable of rewriting information.

The tuner circuit 120 is the well known circuit for an analog television, having a principal part made up of an IC, and is capable of receiving an analog television signal (a type of picture signal) according to a predetermined broadcasting system from the antenna 121, thereby generating an intermediate frequency signal before outputting the same. The predetermined broadcasting system includes the PAL system, the SECAM system, the NTSC system, and so forth, and the tuner circuit may be a circuit for receiving TV signals according to a plurality of broadcasting systems to thereby generate intermediate frequency signals. The tuner circuit 120 has a tuner of the so-called frequency synthesizer type, incorporated therein, and comprises a high frequency amplifier, local oscillation circuit, mixing circuit, and so forth (not shown). Needless to say, the tuner circuit 120 may be a tuner of a voltage synthesizer type, or the like.

The switch circuit 122 has a principal part made up of ICs, and is connected to the microcomputer 110, the tuner circuit 120, and the composite picture input terminal 123. The switch circuit 122 selectively receives the intermediate frequency signal form the tuner circuit 120, and an analog composite picture signal (a type of picture signal) from the terminal 123 according to a selection directive inputted from the microcomputer 110 to thereby separate a synchronizing signal so as to be outputted to the synchronizing signal control circuit 161 while outputting the picture signal from which the synchronizing signal is separated to the AD conversion circuit 141.

The synchronizing signal control circuit 161 receives the synchronizing signal to time the same to the clock signal from the oscillation circuit CLK 2, thereby executing a control to cause signals in the video signal processor 130 to be in sync with each other. The video timing circuit 162 generates a video timing signal to be timed to a YUV signal (signal made up of a luminance signal Y, and color difference signals R-Y, B-Y) generated according to a directive from the synchronizing signal control circuit 161 before outputting the video timing signal to the chroma decoder circuit 143, and the panel timing circuit 163, respectively. The panel timing circuit 163 generates a panel timing signal for timing the RGB signals (signals made up of an R signal, a G signal, and a B signal) as generated to each other before outputting the panel timing signal to the RGB signal processor 150. The RGB signal generator 140 is connected to the I/F 164, executing a predetermined process according to a directive from the microcomputer 110.

The A/D conversion circuit 141 receives the picture signal from which the synchronizing signal is separated to execute A/D conversion to thereby convert the picture signal into digital gradation values in 256 steps, corresponding to respective voltages between a white level and a black level of the picture signal. The A/D conversion circuit 141 then output a digital signal comprising the respective digital gradation values to the YC separation circuit 142. The YC separation circuit 142 receives the digital signal to divide the same into the luminance signal Y, and a carrier color signal C before outputting the same to the chroma decoder circuit 143.

The chroma decoder circuit 143 receives the luminance signal Y, and the carrier color signal C to thereby generate a YUV signal corresponding to the luminance signal Y, and the carrier color signal C to thereby time the YUV signal to the video timing signal before outputting the YUV signal to the picture quality adjustment circuit 144. The picture quality adjustment circuit 144 receives the YUV signal, and executes processes including contrast adjustment, TINT adjustment, brightness adjustment, color adjustment such as skin color correction, black and white elongation adjustment, delay adjustment, and horizontal sharpness adjustment before outputting the YUV signal after processing for those adjustments to the matrix circuit 145.

The matrix circuit 145 receives the YUV signal after processing for those adjustments, and combines the luminance signal Y with the color difference signals R-Y, B-Y to thereby generate the RGB signals that are three kinds of color signals, each corresponding to one of three primary colors, before outputting the same to the pixel number conversion circuit 151. The RGB signals each are picture data expressing a picture in terms of digital gradation value for each of a multitude (a plurality) of pixels by the color, and the greater the gradation value, the brighter the picture becomes (luminance increases) while the smaller the gradation value, the darker the picture becomes (luminance decreases). Red (R), green (G), and blue (B) of RGB correspond to the first to third color components of RGB, respectively.

The RGB signal processor 150 is connected to the I/F 164, executing a predetermined process according to a directive from the microcomputer 110. The memory 155 comprising a RAM is connected to the pixel number conversion circuit 151, the picture quality adjustment circuit 152, the γ correction circuit 153, and the luminance/contrast adjusting circuit 154, and stores the picture data comprising the RGB signals for one screen while holding data for picture quality adjustment, such as an adjustment value for white balance adjustment, and so forth.

The pixel number conversion circuit 151, called also a scaler, receives the RGB signals, and executes a predetermined scaling process for converting the number of the pixels so as to match the number of the pixels of each of liquid crystal panels 182 to 184 to thereby write the RGB signals after conversion of the number of the pixels to the memory 155 in such a way as to be timed to the panel timing signal. With the present embodiment, it is assumed that the number of the pixels of each of the liquid crystal panels 182 to 184 is 640 (row)×480 (column), however, the number of the pixels may be 1024×768, and so forth. It is further assumed that the RGB signals written to the memory 155 are each picture data expressing a picture in terms of the digital gradation value for each of 640×480 pixels by the color, and the digital gradation values represent 256 gradations ranging from 0 to 255.

The picture quality adjustment circuit 152 sequentially refers to the memory 155 for the digital gradation values of the respective pixels by the color, and applies an adjustment process, such as white balance adjustment, contour correction, superimposition of an OSD signal, chroma correction, and so forth, to the respective digital gradation values represented by the RGB signals after conversion of the number of the pixels. The γ correction circuit 153 executes a gamma correction against the RGB signals after the adjustment process described as above, thereby compensating for the gamma characteristic of display of the liquid crystal module 180.

The luminance/contrast adjustment circuit 154 applies a process for luminance adjustment, and contrast adjustment to the picture data after the gamma correction, stored in the memory 155, and expressed in terms of the gradation value for each of the pixels by the color before outputting the picture data processed as above to a control circuit 181 of the liquid crystal module 180. The RGB signal generator 140, and the RGB signal processor 150 constitutes a scaler IC.

The control circuit 181 is an electronic circuit for executing a control/drive process to effect display on the screen, generating voltages by the color for driving the liquid crystal panel 182 for R, the liquid crystal panel 183 for Q and the liquid crystal panel 184 for B, respectively, on the basis of the picture data outputted from the RGB signal processor 150. The backlight 185 is lit up upon supply of the high voltage from the inverter 186, and the light rays of the backlight 185 are transmitted through the liquid crystal panels 182 to 184 from the rear faces thereof toward the front. As a result, the liquid crystal module 180 displays a picture corresponding to the picture data, that is, a picture corresponding to the picture signal on the display screen 199.

(2) A Method for Adjusting White Balance

Chromaticity coordinates expressing NTSC chromaticity in the CIE colorimetric system may be found on the basis of any given RGB data through computation carried out in the following manner. First, the RGB data is converted into tristimulus values along XYZ axes by the following formula:

$$X=0.6070R+0.1734G+0.2006B$$

$$Y=0.2990R+0.5864G+0.1146B$$

$$Z=0.0000R+0.0661G+1.1175B$$

Subsequently, conversion into xy chromaticity coordinates is carried out by use of the following formula:

$$x=X/(X+Y+Z)$$

$$y=Y/(X+Y+Z)$$

Further, since the xy chromaticity coordinates is fewer in coordinate by one, and colors differing in brightness from each other exist at identical chromaticity coordinates, even if contrast is changed during white balance adjustment, this will cause no change in chromaticity coordinates, and the white balance adjustment can be continued.

The method for adjusting the white balance is described in detail hereinafter.

The white balance adjustment of a liquid crystal panel is carried out by the two-point tracking method. With this method, a picture signal at high luminance is inputted to one point, and another picture signal at low luminance is inputted to the other point, and luminance displayed on the liquid crystal panel is measured against the respective picture signals inputted, thereby determining luminance characteristic of the liquid crystal panel against the respective picture signals inputted from those two points, that is, the input-to-luminance characteristic.

Then, respective RGB colors of a picture displayed on a display screen are measured against a white color signal as inputted, and on the basis of data on the respective RGB colors as measured, chromaticity coordinates are found, thereby determining whether or not the chromaticity coordinates matches chromaticity coordinates representing white. According to the NTSC chromaticity coordinates, coordinates representing white are x=0.310, and y=0.316. In the case of no matching at high luminance, determination is made on which color component of the respective RGB colors is insufficient, thereby causing the white balance to be adjusted such that an insufficient color component increases while in the case of no matching at low luminance, determination is made on which color component of the respective RGB colors is excessive, thereby causing the white balance to be adjusted such that an excessive color component decreases. Thereafter, respective RGB colors of the picture displayed on the display screen are again measured, thereby comparing chromaticity coordinates with the chromaticity coordinates as found before a change of the adjustment value.

With the liquid crystal display unit, there can be a case where an open-area ratio of each of the liquid crystal cells turns to 100% or 0% at this point in time, so that the chromaticity coordinates does not change from the chromaticity coordinates as found before the change of the adjustment value. Such a case can be coped with by lowering contrast. If the contrast is lowered, this will cause luminance outputted to the display screen against an identical picture signal to be decreased on a high luminance side, and to be increased on a low luminance side. In other words, the open-area ratio of each of the liquid crystal cells becomes smaller on the high luminance side, and greater on the low luminance side.

Thus, it is possible to effect the white balance adjustment at high luminance as well as low luminance without being affected by restrictions imposed by the open-area ratio of each of the liquid crystal cells, thereby enabling the input-to-luminance characteristics at all luminance values to be determined with high precision by use of the two-point tracking method.

Figure 4:
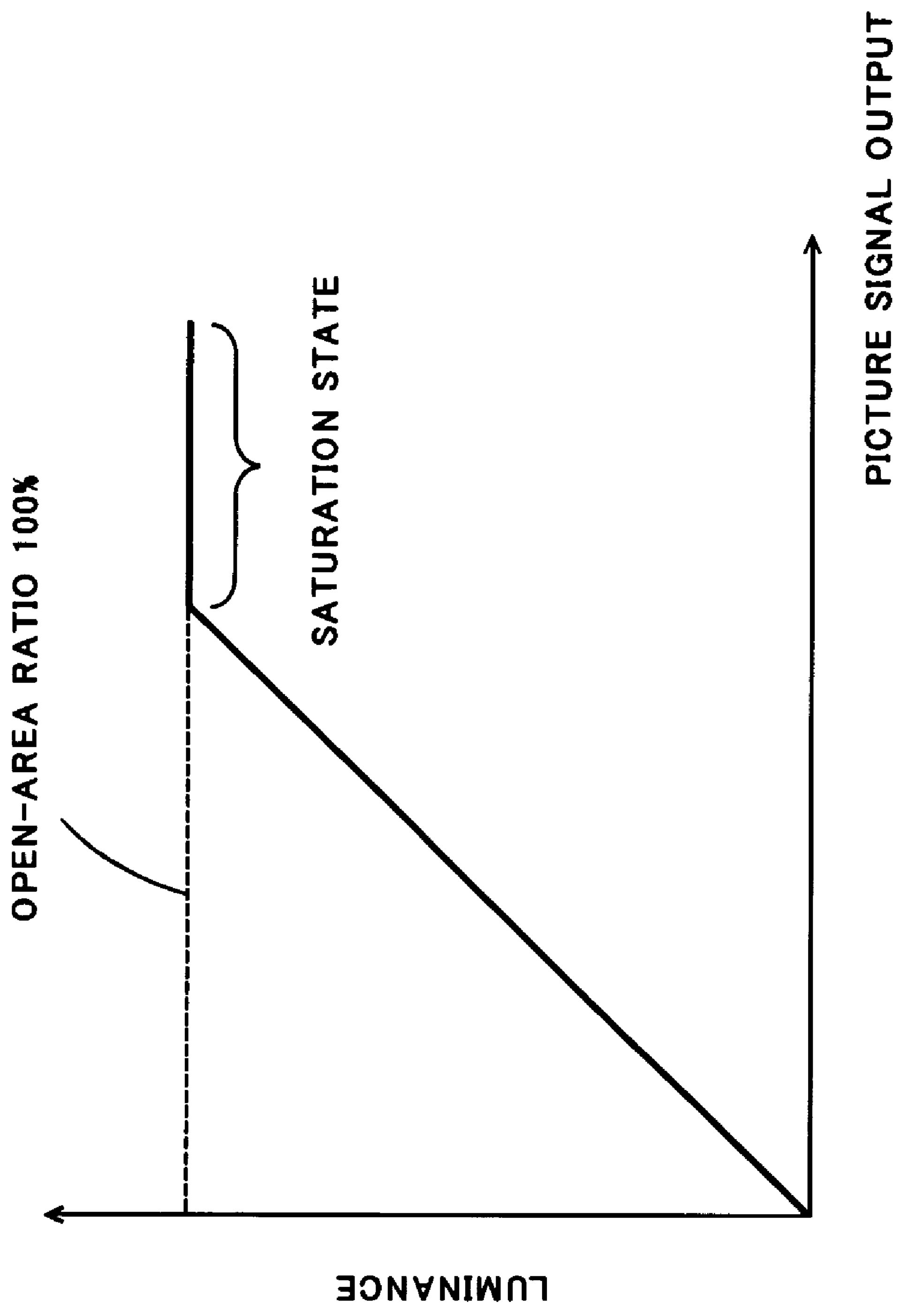
FIG. 4 is an exemplary illustration of a graph showing a relationship between a cell open-area ratio of a liquid crystal cell in a liquid crystal panel, and an output.

FIG. 4 is a graph showing a relationship between the cell open-area ratio of a liquid crystal cell for any color among the RGB colors, among the liquid crystal cells in the liquid crystal panel, and an output against the cell open-area ratio. Since the light source of the liquid crystal panel is the backlight, the luminance of the liquid crystal panel will increase up to a predetermined value accompanying an increase in the cell open-area ratio. However, the luminance will not rise any further once the cell open-area ratio reaching 100%, remaining at the predetermined value even if the picture signal inputted rises in level. Such a state of the luminance is defined as a saturation state.

With the present invention, for the white balance adjustment, chromaticity is adjusted by adjusting respective outputs of the RGB three colors. In this case, it is possible to adjust the chromaticity because the luminance is shifted into an adjustable range by lowering contrast (outputs of the RGB three colors) in the display screen at a point in time when the cell open-area ratio for any color among the RGB colors reaches 100%, and the luminance does not rise any further, that is, when it is detected that the chromaticity does not change even if the outputs for the respective colors are increased.

Figure 5:
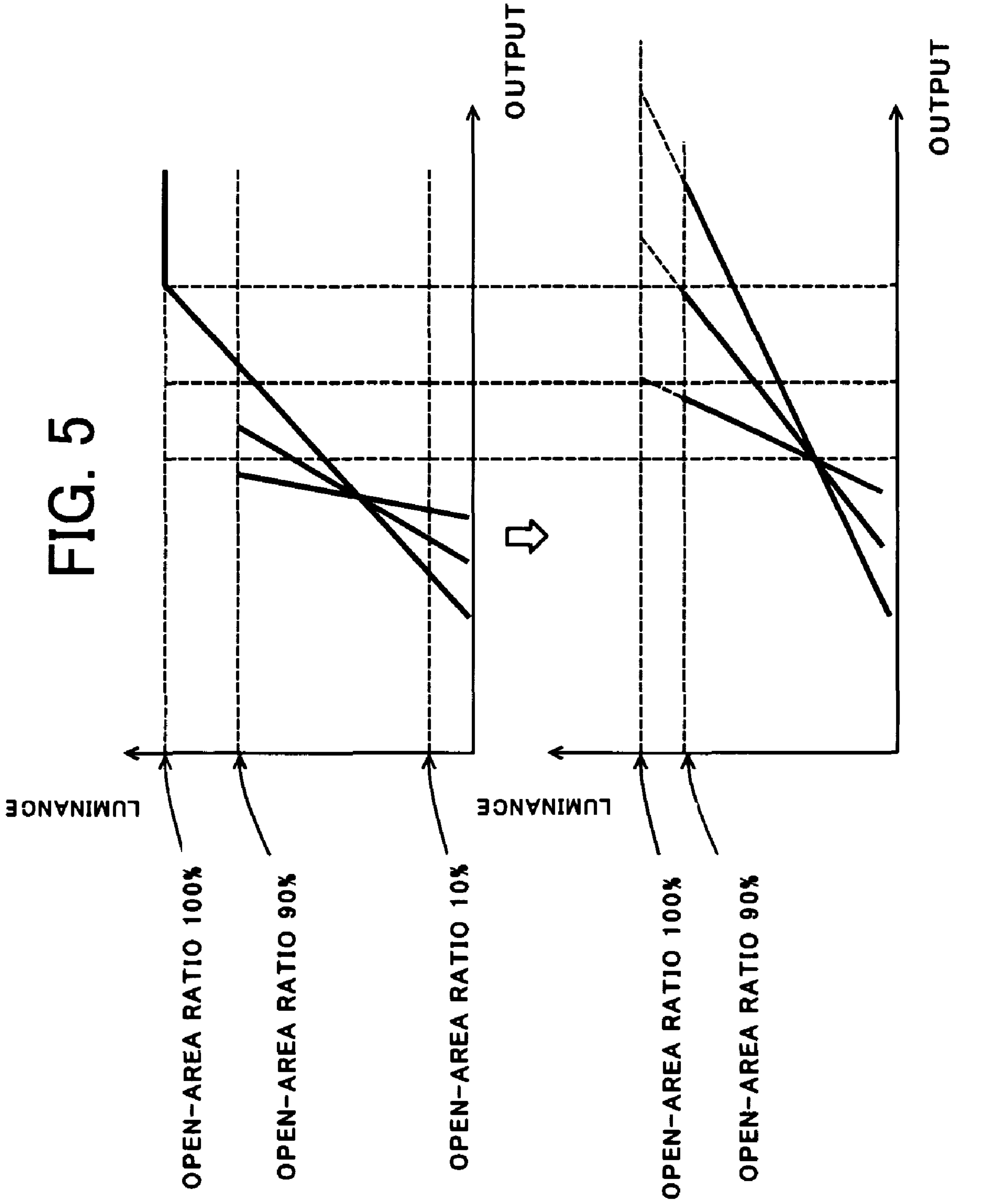
FIG. 5 is an exemplary illustration of a graph for describing a method for adjusting white balance.

In FIG. 5, there is shown a graph for describing the method for adjusting the white balance. With reference to a graph shown in the upper part of the figure, there is described a case where the cell open-area ratio of each of the liquid crystal cells for the respective colors, starting the white balance adjustment on the high luminance side, against an output for contrast at the start of the adjustment, is set to 90%, and, blue (B) is too low in luminance to cause the white color to be produced from the display screen with the cell open-area ratio kept at 90%.

When B is low in luminance, the cell open-area ratio for B is increased to cause the luminance of B to rise. However, there is case where B is found insufficient in luminance to produce the white color even if the cell open-area ratio is set to 100%. In such a case, even if an output to the cell for B is increased, the luminance of B will not rise any further as the luminance will reach the saturation state, so that the adjustment cannot be implemented. Of course, if outputs for red (R) and green (G) are decreased, the adjustment can be effected however, accuracy in adjustment for R and G then undergoes deterioration, which is quite other than the object of the present invention, so that such a practice is not adopted in the present invention.

Accordingly, the contrast is lowered at point in time when the luminance of B has reached the saturation state, whereupon the luminance is shifted inward in the graph to be thereby shifted into the adjustable range, so that the adjustment can be implemented. Similarly, luminance values of the three colors, on the low luminance side, are also adjusted, respectively. The above is repeated in automatic adjustment, thereby implementing the white balance adjustment in high precision.

(3) Configuration of a Computer for Adjustment

Figure 6:
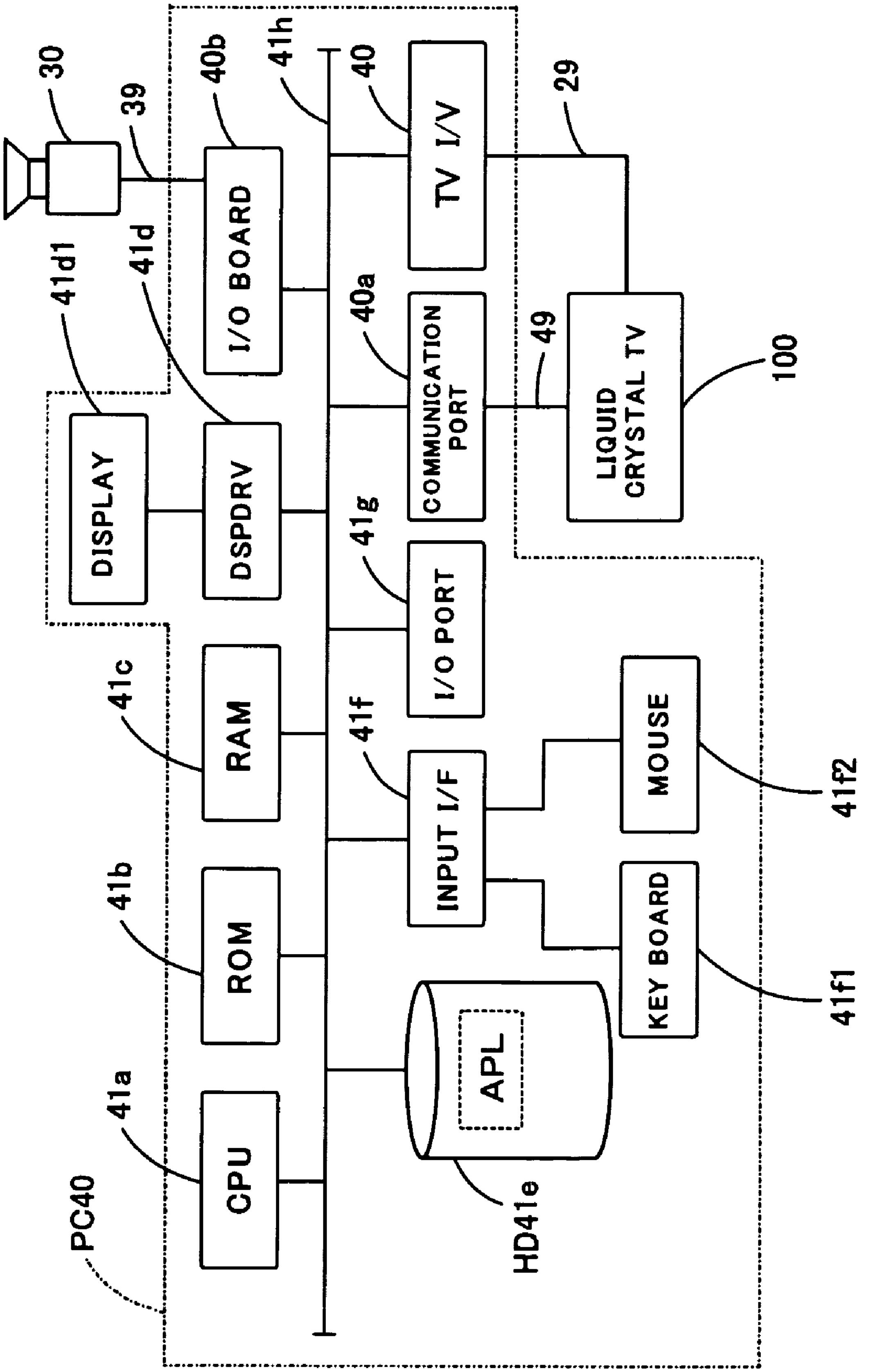
FIG. 6 is an exemplary illustration of a block diagram broadly showing the configuration of a personal computer for adjustment.

As shown in FIG. 6, with the PC (personal computer for adjustment) 40, a bus 41*h* is connected to a CPU 41*a*, ROM 41*b*, RAM 41*c*, display I/F 41*d*, hard disk (HD) 41*e* having a driver function, an input I/F 41*f*, I/O port 41*g*, a communication port 40*a*, an I/O board 40*b*, a TV I/F 40*c*, and so forth. For the communication port 40*a*, use can be made of, for example, a LPT port, RS-232-port, COM port, or the equivalent. A display 41*d*1 is connected to the display I/F 41*d*, and a keyboard 41*f*1, and a mouse 41*f*2 are connected to the input I/F 41*f* The IIC bus data port 103 of the TV 100 is connected to the communication port 40*a* via the cable 49, and the color analyzer 30 is connected to the I/O board 40*b* via the cable 39. The TV terminal 123 is connected to the TV I/F 40*c* via the signal cable 29.

The CPU 41*a* performs a predetermined control program written into the ROM 41*b* while using the RAM 41*c* as a work area. The HD 41*e* stores an application program (APL) for performing a process for deciding a correction table for the gamma correction to be stored in the TV, an APL for generating a reference picture signal, and an ideal luminance line (curve), which are read by the RAM as necessary, thereby the APL being formed.

On the basis of hardware described as above, the PC 40 causes a test pattern white in color to be displayed on the display screen of the TV 100, and causes the test pattern as displayed to be subjected to calorimetrical measurement by the color analyzer, thereby executing a process for setting an adjustment value for adjusting the white balance according to the results of the calorimetrical measurement into the TV 100.

Further, the PCs of various-types such as a desktop type, notebook type, and mobile-capable type can be adopted for the PC 40, however, a computer other than the PCs can be adopted. The computer 40 for adjustment, and the color analyzer 30 make up an adjustment unit for setting a white balance adjustment value into the liquid crystal display unit.

Figure 7:
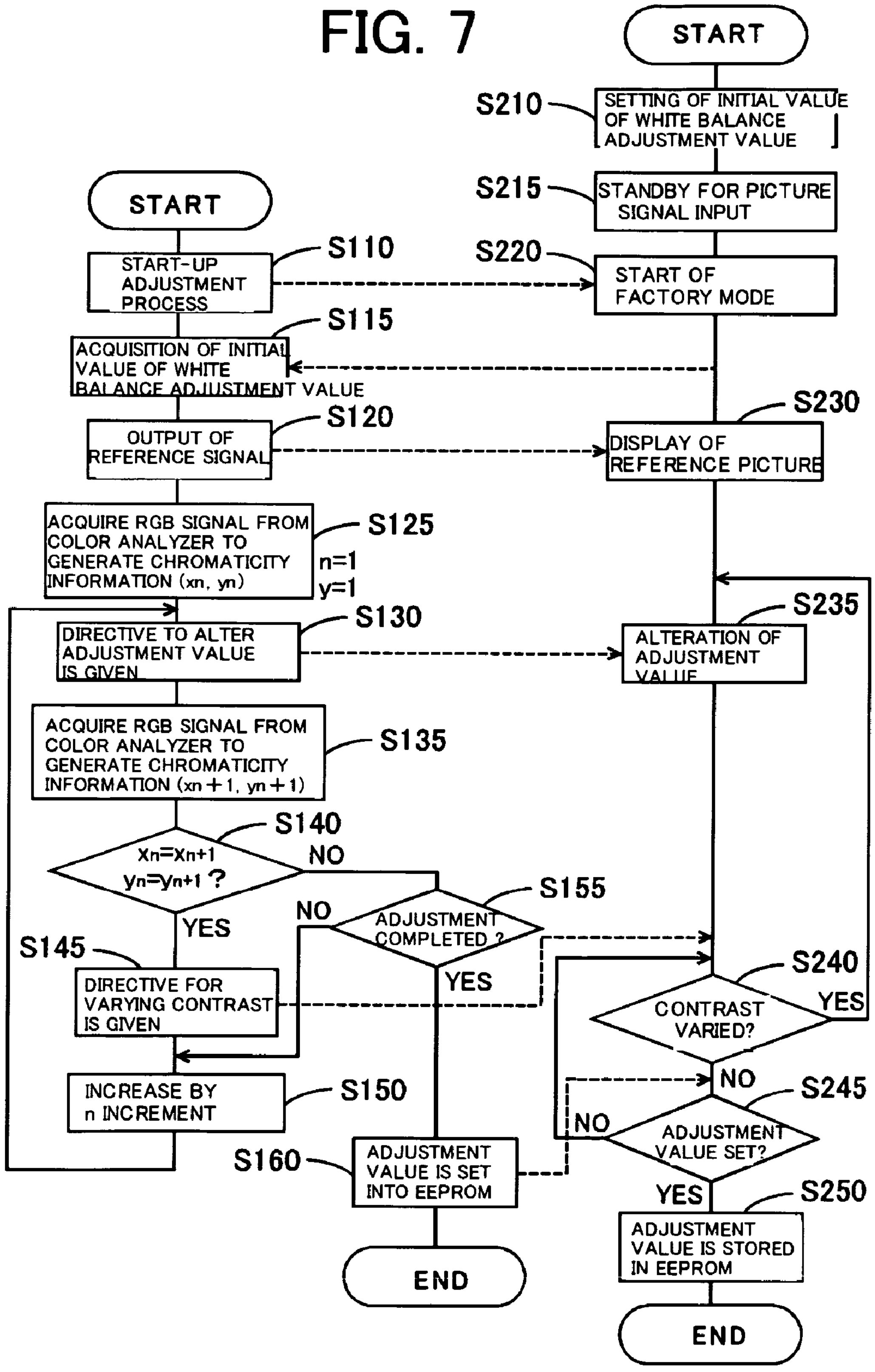
FIG. 7 is an exemplary illustration of a flow chart showing the flow of an adjustment process for the liquid crystal television adjustment system according to the invention.

(4) Description on a Process for White Balance Adjustment, and a Method for Adjusting a Liquid Crystal Television FIG. 7 shows flow of an adjustment process for the liquid crystal television adjustment system according to the invention, showing respective processes executed by the computer 40 for adjustment, and the liquid crystal TV 100, by use of a flow chart. Those processes are executed according to a white balance adjustment program performed by the CPU 41*a* of the PC 40, or according to a white balance adjustment program performed by the microcomputer 110 of the liquid crystal TV 100.

In the case where the microcomputer 110 of the liquid crystal TV 100 is provided with a program for white balance adjustment, according to which those processes are executed, the PC 40 is no longer required, so that the process to be otherwise executed by the PC 40 hereinafter is executed by the microcomputer 110. With the present embodiment of the invention, the white balance adjustment program is executed by the CPU 41*a* of the PC 40.

Further, it is assumed that picture quality of the TV is adjusted in the final adjustment step at a factory where the TV is manufactured. The EEPROM 112 with an initial value of the white balance adjustment value, written thereto, is mounted in the TV before execution of the present processes.

Upon a factory worker turning ON the power supply 190 of the TV 100, of which picture quality is to be adjusted, the TV 100 acquires the initial value of the white balance adjustment value from a predetermined address in the EEPROM 112 to thereby store the same in the memory 155 while starting to accept an input of the reference signal of the picture signal from the terminal 123 (Steps S210 to S215). More specifically, the TV 100 causes the picture quality adjustment circuit 152 to execute adjustment of a picture signal as inputted on the basis of the white balance adjustment value while holding the initial value of the white balance adjustment value in the memory 155, and stands by in a state ready for outputting picture data to the liquid crystal module 180.

The operation of the TV 100, described hereinabove, represents an operation executed during a start-up operation adopted in normal applications, as well. Thus, the microcomputer 110 that executes a process in Steps S210 to S215 constitutes an adjustment value setting unit for setting the white balance adjustment values by setting the output ratio among the first to third color components of the picture data.

Next, the PC 40 is connected to the TV 100, and the factory worker executes a predetermined operation at the PC 40 to thereby start up the flow of the adjustment process (Step S110), whereupon the TV 100 is changed over from a normal mode to a factory mode in Step 220. In the factory mode, the initial value of the white balance adjustment value stored at the predetermined address in the EEPROM 112 can become rewritable on demand of the computer 40 for adjustment.

Meanwhile, with the PC 40, upon start-up of the flow of the adjustment process in Step S110, the initial value of the white balance adjustment value is acquired from the EEPROM 112 of the TV 100 in Step S115 to be then stored in the RAM 41*c*. Subsequently, in Step S120, the reference signal is generated according to the application program (APL) stored in the HD 41*e* to be outputted to the TV 100 standing by in a state of signal acceptance for the reference signal. The reference signal is a picture signal expressing white. Thus, the PC 40 that executes Step S120 of the process constitutes a white picture signal outputting unit for outputting a picture signal for a white color to the liquid crystal display unit.

Then, the TV 100 standing by in the state of the signal acceptance corrects white balance of the reference signal on the basis of the adjustment value as set, thereby outputting the reference signal as inputted to the liquid crystal module 180 (Step S230). A picture appearing on the liquid crystal module 180 is white or substantially white in color. The color analyzer 30 picks up an image of the picture displayed on the liquid crystal module 180 as a pictorial image through the CCD image pickup device 31, and so forth, thereby detecting the image as the luminance values of the respective RGB colors. The color analyzer 30 is connected to the PC 40, and the application program (APL) performed by the PC 40 computes chromaticity (xn, yn) on the basis of the luminance values of the respective RGB colors as inputted from the color analyzer 30 to cause the chromaticity to be in the RAM 41*c* (Step S125). In this case, "n" is assumed that n=1.

In Step S130, on the basis of the chromaticity as computed in Step S125, the PC 40 determines which color component among the RGB colors is to be changed to obtain white in color, and generates such a white balance adjustment value as causes a color displayed on the liquid crystal module 180 to turn white, thereby outputting a white balance adjustment value as generated to the TV 100. The TV 100 then alters the adjustment value in the memory 155 to the value outputted by the PC 40 in Step S130 (Step S235).

Upon completion of Step S235, the white balance of the reference signal is adjusted on the basis of the adjustment value as altered, and the reference signal is outputted to the liquid crystal module 180. Since the color analyzer 30 picks up the image of the picture appearing on the liquid crystal module 180, and keeps detecting the same as the luminance values of the respective RGB colors, the PC 40 acquires again the luminance values of the respective RGB colors from the color analyzer 30 upon completion of alteration of the adjustment value to thereby compute chromaticity, storing respective chromaticity as (xn+1, yn+1) in the RAM 41*c* (Step S135). Information expressing chromaticity during the flow of the adjustment process is provided with information showing how many adjustments are made before the information is generated, and information expressing chromaticity for every adjustment is stored in the RAM 41*c*.

Thus, the PC 40, together with the color analyzer 30, for executing Steps S125, and S135, constitute a chromaticity information acquiring unit for measuring the respective luminance values of the first to third color components from the picture displayed on the display screen of the liquid crystal display unit on the basis of the picture signal as outputted, thereby generating chromaticity information.

Now, determination is made on whether or not the chromaticity after the alteration of the adjustment value is changed from that before the alteration of the adjustment value by comparing the chromaticity (xn, yn) with the chromaticity (xn+1, yn+1) (Step S140). In the case of a change having occurring to the chromaticity, that is, xn≠xn+1, or yn≠yn+1, then the process proceeds to Step S145 as it is regarded that a precondition is met while in the case of no change having occurring to the chromaticity, that is, xn=xn+1, or yn=yn+1, then the process proceeds to Step S155 as it is regarded that the precondition is not met. A change having occurring to the chromaticity indicates that the luminance of the respective RGB colors are not in the saturation state, and no change having occurring to the chromaticity indicates that the luminance of the respective RGB colors are in the saturation state.

Thus, the PC 40 that executes Step S140 of the process constitutes a chromaticity saturation determination unit for altering the respective outputs of the first to third color components of the picture displayed on the display screen by a predetermined amount, thereby determining whether or not the chromaticity information undergoes a change.

As the precondition is met in Step S140, the process proceeds to Step S145, whereupon the PC 40 outputs a control signal giving a directive for lowering contrast to the TV 100. Subsequently, an "n" value is increased by one (an increment) (Step S150), and the process is repeated after reverting to Step S130.

Meanwhile, as the precondition is not met in Step S140, the process proceeds to Step S155, whereupon determination is made on whether or not chromaticity computed on the basis of the luminance values of the respective RGB colors, images of which are picked up by the color analyzer 30, fall within predetermined threshold values against the NTSC chromaticity coordinates representing white, x=0.310, y=0.316. If the chromaticity is found falling within the predetermined threshold values, then the process proceeds to Step S160 as it is regarded that a precondition is met while if the chromaticity is found falling outside the predetermined threshold values, the process proceeds to Step S150 as it is regarded that the precondition is not met. Needless to say, the chromaticity coordinates adopted in this case may be the HDTV chromaticity coordinates, or any other chromaticity coordinates.

Thus, the PC 40 that executes Step S155 of the process constitutes a chromaticity determination unit for determining whether or not the chromaticity information substantially matches chromaticity information on a white color when the chromaticity saturation determination unit determines that the chromaticity information has changed.

If it is found that the precondition is met in Step 155, and the process proceeds to Step S160, the PC 40 outputs a control signal indicating completion of the adjustment to the TV 100, thereby completing the adjustment process.

In Step S240 after completion of the process in Step S235, the TV 100 determines whether or not it has accepted the control signal giving the directive for lowering the contrast, and if it has accepted the control signal giving the directive for lowering the contrast, the TV 100 causes the contrast to be lowered by a predetermined amount, and the process reverts to Step S235 as a precondition is met, thereby repeating the process therefrom while if the TV 100 has not accepted the control signal, the process proceeds to Step S245 as the precondition is not met.

Thus, the microcomputer 110 that executes Step 145 of the process constitutes a contrast adjustment directing unit for lowering the contrast on the display screen by the predetermined amount by controlling the liquid crystal display unit when the chromaticity saturation determination unit determines that the chromaticity information has not undergone a change, and the microcomputer 110 that executes Step 240 of the process constitutes a contrast adjustment unit for causing the contrast to be lowered by a predetermined amount by controlling the adjustment unit. The predetermined amount may be set by a factory worker as appropriate, or may be preset.

In Step 245, the TV 100 determines whether or not it has received a control signal indicating completion of the adjustment, and if the TV 100 has received the control signal, the process proceeds to Step S250 as a precondition is met while if the TV 100 has not received the control signal, the process reverts to Step S240 as the precondition is not met, thereby repeating the process therefrom. Subsequently, if the precondition is met in Step 245, the process proceeds to Step S250, whereupon the TV 100 reads the adjustment value from the memory 155 to store the same in the EEPROM 112, thereby completing the adjustment process.

Thus, the PC 40 that executes Step S160 of the process constitutes an adjustment value setting unit for setting predetermined adjustment values to the liquid crystal display unit, and the microcomputer 110 that executes Step 250 of the process constitutes an adjustment value storing unit for causing the adjustment values as set by the adjustment unit to be stored in the semiconductor memory.

Next, there will be described hereinafter operation of the present embodiment of the invention, having the above-described configuration.

When the factory worker intends to execute the white balance adjustment, the power supply of the TV 100 is first turned ON. Then, the TV 100 acquires the initial value of the white balance adjustment value from the predetermined address in the EEPROM 112 to thereby store the initial value of the white balance adjustment value in the memory 155, and stands by in a state ready for accepting the input of the reference signal of the picture signal from the terminal 123 (Steps S210 to S215).

Next, the worker connects the PC 40 to the TV 100, and executes the predetermined operation at the PC 40 to thereby start up the flow of the adjustment process, whereupon the TV 100 is changed over from the normal mode to the factory mode, and the predetermined address in the EEPROM 112 of the TV 100, where the white balance adjustment value is stored, becomes rewritable from the PC 40 (Steps S110, S220).

Upon the start of the flow of the adjustment process at the PC 40, the PC 40 acquires the initial value of the white balance adjustment value from the EEPROM 112, and outputs the reference signal expressing white to the TV 100, thereby displaying a picture corresponding to the reference signal on the display screen of the TV 100 (Steps S120, S230).

The color analyzer 30 picks up the image of the picture corresponding to the reference signal, displayed on the display screen of the TV 100, and the picture is outputted as voltage signals expressing the luminance values of the respective RGB colors to the PC 40. Then, the PC 40 generates information expressing chromaticity on the basis of the voltage signals expressing the luminance values of the respective RGB colors as inputted from the color analyzer 30 to thereby store the information in the RAM 41*c* (Step S125).

Subsequently, on the basis of the information expressing the chromaticity, the PC 40 generates a white balance adjustment value for causing the picture displayed on the display screen of the TV 100 to turn white in color, thereby causing the TV 100 to set the white balance adjustment value as generated, whereupon the white balance of the picture is more properly adjusted, so that a picture in color closer to white is displayed on the display screen (Steps S130, S235).

Then, the PC 40 acquires the voltage signals expressing the luminance values of the respective RGB colors as inputted from the color analyzer 30 to thereby generate the information expressing the chromaticity to be stored in the RAM 41*c* (Step S135). The information expressing the chromaticity generated at the preceding time is compared with the information expressing the chromaticity generated this time, and determination is made on whether or not there has occurred a difference in chromaticity between the picture displayed in the TV 100 this time, and the picture displayed in the TV 100 at the preceding time (Step S140). In the case of a change having occurring to the chromaticity, determination is made on whether or not the chromaticity matches the chromaticity representing white (Step S155) while in the case of no change having occurring to the chromaticity, the PC 40 causes the contrast of the TV 100 to be lowered, thereby repeating the process after reverting to Step S130 (Steps S145, S150, S240).

Meanwhile, if it is determined that the chromaticity does not match the chromaticity representing white in Step S155 for a determination process, the process from Step S130 is repeated while if it is determined that the chromaticity matches the chromaticity representing white, the PC 40 causes the TV 100 to store the white balance adjustment value at the predetermined address in the EEPROM 112 (Steps S160, S245, S250), thereby completing the adjustment process.

(5) Conclusion

To sum up, the PC 40 outputs the picture signal for the white color to the TV 100 to thereby generates the chromaticity information by measuring the respective luminance values of the first to third color components from the picture displayed on the display screen of the TV 100, and determines whether or not the chromaticity information undergoes a change by varying an output of any of the first to third color components of the picture displayed on the display screen by the predetermined amount. Subsequently, when the chromaticity information has not undergone a change, the contrast of the TV 100 is lowered by the predetermined amount, and re-acquisition·re-determination of chromaticity information is executed. On the other hand, when the chromaticity information has undergone a change, determination is made on whether or not the chromaticity information substantially matches the chromaticity information representing white, and in the affirmative case, the white balance adjustment value is stored in the EEPROM 112 while in the negative case, the re-acquisition·re-determination of chromaticity information is repeated.

Further, it is to be understood that obviously the invention is not limited to those embodiments described in the foregoing, and that such modifications as described hereinafter by way of example will be apparent to those skilled in the art as one of embodiments of the invention:

adoption of mutually replaceable members disclosed in those embodiments, and configuration thereof or the equivalent after changing combination thereof as appropriate;

adoption of members and configuration or the equivalent, according to the well known technology, although not disclosed in those embodiments, after replacing the members and configuration or the equivalent, disclosed in those embodiments, as appropriate, or after changing combination thereof;

adoption of members and configuration or the equivalent, based on the well known technology, although not disclosed in those embodiments, which those skilled in the art can anticipate as substitutes for the members and configuration or the equivalent, disclosed in those embodiments, after replacement as appropriate or after changing combination thereof.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

What is claimed is:

1. A liquid crystal television adjustment system comprising:

a liquid crystal television including a tuner for receiving an analog television signal according to a predetermined broadcasting system from an antenna, thereby generating an intermediate frequency signal before outputting the same, a nonvolatile semiconductor memory capable of rewriting information, a scaler IC for executing analog-to-digital conversion of an analog picture signal as inputted, and generating RGB picture signals to thereby execute white balance adjustment for respective RGB color components of the RGB picture signals by referring to a white balance adjustment value stored in the nonvolatile semiconductor memory, before outputting a picture with white balance adjusted, a liquid crystal module for displaying a picture on a predetermined screen on the basis of the RGB picture signals as inputted, and a microcomputer for controlling the tuner, nonvolatile semiconductor memory, scaler IC, and liquid crystal module; and a computer including a color analyzer capable of picking up an image of a screen of the liquid crystal television, and outputting information corresponding to luminance of a picture as picked up, for causing a test pattern in white to be displayed on the screen of the liquid crystal television, causing the color analyzer to pick up an image of the test pattern displayed on the screen, and acquiring the information corresponding to the luminance of the picture as picked up, thereby setting an adjustment value for adjusting white balance according to the information acquired into the liquid crystal television, wherein the microcomputer sets a white balance adjustment value by setting an output ratio among the respective RGB color components of the RGB picture signals, and causes contrast to be lowered by a predetermined amount by control of the computer to thereby cause the adjustment value set by the computer to be stored in the nonvolatile semiconductor memory, and the computer outputs a picture signal for a white color that is a reference signal to the liquid crystal television, causing the color analyzer to pick up the image of the picture displayed on the screen of the liquid crystal television on the basis of the picture signal outputted, acquires information expressing luminance values of the respective RGB colors of the picture as picked up to thereby generate information expressing chromaticity, determines whether or not the information expressing the chromaticity undergoes a change by increasing outputs of the respective RGB colors of the picture displayed on the screen by a predetermined amount at high luminance while determining whether or not the information expressing the chromaticity undergoes a change by decreasing the outputs of the respective RGB colors of the picture displayed on the screen by a predetermined amount at low luminance, lowers the contrast in the screen by a predetermined amount by controlling the liquid crystal television when it is determined that the information expressing the chromaticity has not changed, and sets the adjustment value into the liquid crystal television when the information expressing the chromaticity substantially matches information expressing chromaticity of a white color.

2. A liquid crystal display unit adjustment system comprising:

a liquid crystal display unit for generating picture data expressed in terms of first to third color components, and expressed in terms of digital gradation value for each of a multitude of pixels making up a screen on the basis of a picture signal inputted while storing an adjustment value for adjusting white balance of the picture data in a nonvolatile semiconductor memory, and executing white balance adjustment of the picture data by referring to the adjustment value before displaying a picture on a predetermined screen; and an adjustment unit for setting the adjustment value for adjusting the white balance into the liquid crystal display unit, wherein the liquid crystal display unit includes an adjustment value setting unit for setting the adjustment value for adjusting white balance by setting an output ratio among the first to third color components of the picture data, a contrast adjustment unit for causing contrast to be lowered by a predetermined amount by controlling the adjustment unit, and an adjustment value storing unit for causing the adjustment value as set by the adjustment unit to be stored in the semiconductor memory, and the adjustment unit is equipped with a white picture signal outputting unit for outputting a picture signal for a white color to the liquid crystal display unit, a chromaticity information acquiring unit for measuring the respective luminance values of the first to third color components from the picture displayed on the screen of the liquid crystal display unit on the basis of the picture signal as outputted, thereby generating the chromaticity information, a chromaticity saturation determination unit for altering the respective outputs of the first to third color components of the picture displayed on the screen by a predetermined amount, thereby determining whether or not the chromaticity information undergoes a change, a contrast adjustment directing unit for lowering the contrast on the screen by the predetermined amount by controlling the liquid crystal display unit when the chromaticity saturation determination unit determines that the chromaticity information has not undergone a change, a chromaticity determination unit for determining whether or not the chromaticity information substantially matches chromaticity information on a white color when the chromaticity saturation determination unit determines that the chromaticity information has changed, and an adjustment value setting unit for setting a predetermined adjustment value into the liquid crystal display unit.

3. A liquid crystal display unit adjustment system according to claim 2, wherein the white balance is adjusted by the two-point tracking method.

4. A liquid crystal display unit adjustment system according to claim 2, wherein in the case of adjusting the white balance at a point on a high luminance side, the chromaticity saturation determination unit determines whether or not the chromaticity information undergoes a change by increasing an output of any of the first to third color components by a predetermined amount.

5. A liquid crystal display unit adjustment system according to claim 2, wherein in the case of adjusting the white balance at a point on a low luminance side, the chromaticity saturation determination unit determines whether or not the chromaticity information undergoes a change by decreasing an output of any of the first to third color components by a predetermined amount.

6. A liquid crystal display unit adjustment system according to claim 2, wherein the liquid crystal display unit comprises a tuner for receiving television signals at desired frequencies via an antenna, and selecting only a required signal out of the television signals received before outputting an analog picture signal, a nonvolatile semiconductor memory capable of rewriting information, a scaler IC for executing analog-to-digital conversion of the analog picture signal as inputted, and generating RGB picture signals expressed in respective RGB color components to thereby execute white balance adjustment for the respective RGB color components of the RGB picture signals by referring to white balance adjustment values stored in the nonvolatile semiconductor memory, before outputting a picture with white balance adjusted, a liquid crystal module for displaying a picture on a predetermined screen on the basis of the RGB picture signals as inputted, and a microcomputer for controlling the tuner, nonvolatile semiconductor memory, scaler IC, and liquid crystal module.

7. A liquid crystal display unit for generating picture data expressed in terms of first to third color components, and expressed in terms of digital gradation value for each of a multitude of pixels making up a screen on the basis of a picture signal inputted while storing an adjustment value for adjusting white balance of the picture data in a nonvolatile semiconductor memory, and executing white balance adjustment of the picture data by referring to the adjustment value before displaying a picture on a predetermined screen, said liquid crystal display unit comprising:

an adjustment value setting unit for setting the adjustment value for adjusting white balance by setting a output ratio among the first to third color components of the picture signal inputted;

a white picture signal outputting unit for outputting a picture signal for a white color to the screen;

a chromaticity information acquiring unit for measuring respective luminance values of the first to third color components of the picture displayed on the screen of the liquid crystal display unit on the basis of the picture signal as outputted, thereby acquiring chromaticity information;

a chromaticity saturation determination unit for altering respective outputs of the first to third color components of the picture displayed on the screen by a predetermined amount, thereby determining whether or not the chromaticity information undergoes a change;

a contrast adjustment directing unit for lowering the contrast on the screen by a predetermined amount by controlling the liquid crystal display unit when the chromaticity saturation determination unit determines that the chromaticity information has not undergone a change;

a chromaticity determination unit for determining whether or not the chromaticity information substantially matches chromaticity information on a white color when the chromaticity saturation determination unit determines that the chromaticity information has changed; and an adjustment value storing unit for storing the adjustment value in the nonvolatile semiconductor memory.

* * * * *